United States Patent [19]
Katz

[11] 3,916,993
[45] Nov. 4, 1975

[54] METHOD OF PRODUCING NATURAL GAS FROM A SUBTERRANEAN FORMATION

[75] Inventor: Marvin LaVerne Katz, Dallas, Tex.

[73] Assignee: Atlantic Richfield Company, Los Angeles, Calif.

[22] Filed: June 24, 1974

[21] Appl. No.: 482,074

[52] U.S. Cl. .................. 166/248; 166/302; 166/272
[51] Int. Cl.² .......................................... E21B 43/24
[58] Field of Search ...... 166/248, 302, DIG. 1, 314, 166/272

[56] References Cited
UNITED STATES PATENTS

| | | | |
|---|---|---|---|
| 3,627,047 | 12/1971 | Wilson et al. | 166/DIG. 1 X |
| 3,757,860 | 9/1973 | Pritchett | 166/248 |
| 3,766,980 | 10/1973 | Kern | 166/248 |

*Primary Examiner*—Stephen J. Novosad
*Attorney, Agent, or Firm*—James C. Fails

[57] ABSTRACT

Method of producing gas from subterranean formations characterized by the steps of drilling and completing a plurality of at least two wells in a subterranean formation that contains at least some of the gas in the form of hydrate; melting the hydrates in the subterranean formation to free natural gas in situ; and producing to the surface natural gas freed by melting the hydrates. Melting of the hydrates includes the step of heating the subterranean formation and the hydrates by passage of a predetermined electrical current from one of the wells to the other. Preferably, the melting of the hydrates also includes the step of simultaneously producing gas to lower the pressure in the subterranean formation below what it would otherwise be and consequently lower the equilibrium temperature at which the hydrates can be melted. Also disclosed are specific apparatus elements and method steps employed in performing this invention in a hydrate-containing subterranean formation.

5 Claims, 3 Drawing Figures

METHOD OF PRODUCING NATURAL GAS FROM A SUBTERRANEAN FORMATION

BACKGROUND OF THE INVENTION

1. Field of the Invention

This invention relates to a method of producing natural gas from a subterranean formation. More particularly, this invention relates to a method of producing natural gas from a subterranean formation in which the natural gas is trapped in an immobile form.

2. Description of the Prior Art

Very few fields of technology have so rewarded workable innovation as the recovery of hydrocarbons from subterranean formations. Consequently, there have been many imaginative methods and apparatus proposed for production of hydrocarbons from subterranean formations. Many of the proposed methods have been expensive and unworkable; but many have increased the recovery of the hydrocarbons from the subterranean formations and have benefited mankind.

With the advent of the increasing value of hydrocarbons, the volumes of hydrocarbons left in the subterranean formation have constituted increasing incentive for innovative methods for better recovery. Despite the application of the best known technology, one of the problems that has recently arisen is in shallow formations that appear, on the various logs that are run, to contain hydrocarbons; but fail to produce hydrocarbons or produce only very small quantities on drill stem tests or the like. Such formations fail to produce even though they have all of the usual indications of resistivity and porosity characteristics, as measured by electric logs, gamma ray logs, and even neutron logs. In fact, the more sophisticated logs, such as nuclear magnetic resonance logs measuring electron spin resonance or the like, indicate that hydrogen is present in hydrocarbon molecules; yet none or little are produced when tested!

Thus, by conventional petroleum and natural gas engineering, such formations are deemed nonproductive and wells have not been completed in these formations heretofore.

SUMMARY OF THE INVENTION

Accordingly, it is an object of this invention to provide an improved method of producing hydrocarbons, such as natural gas, particularly from formations that have heretofore been deemed nonproductive.

Specifically, it is an object of this invention to render mobile, immobilized natural gas in a subterranean formation and produce the natural gas to the surface.

These and other objects will become apparent from the descriptive matter hereinafter, particularly when taken in conjunction with the appended drawings.

In accordance with this invention, natural gas is produced from subterranean formations heretofore considered nonproductive by a multi-step process. First, a plurality of at least two wells extending from the surface into the subterranean formation are completed in the formation even though it indicates on drill stem tests and the like to contain less than the amount of free gas considered to be commercially productive by conventional standards. The subterranean formation is selected for completion if its temperature and pressure relationships are such that hydrates can form and the natural gas be tied up by the formation of the hydrates in combination with the water in the formation. Next, the hydrates are melted in the subterranean formation to free the natural gas in situ. The melting of the hydrates includes the step of heating the subterranean formation by electrical conductivity, or passing a predetermined electrical current, from one of the wells to the other. The natural gas that is freed by melting the hydrates is produced from the subterranean formation to the surface via the wells.

Preferably, the natural gas is produced simultaneously with its being freed so as to reduce the pressure and consequently reduce the temperature at which the hydrates can be melted.

DESCRIPTION OF THE PREFERRED EMBODIMENTS

Many of the so-called "nonproductive" subterranean formations; particularly, those at relatively shallow depths in cold regions of the earth; have pressure-temperature characteristics that are conducive to tying up natural gas therewithin in the form of hydrates with the water in the formation. For example, in one area of the arctic region of the earth, temperature varies with the formation depth below the surface approximately in the following manner:

$$T = 15 + 0.013 D \qquad (I)$$

where $T$ = temperature, °F
$D$ = depth, feet (ft.)

In the same area formation pressure varies with depth approximately in the following manner:

$$P = 0.45 D \qquad (II)$$

where $P$ = pressure, pounds per square inch (psi)
$D$ = depth, ft.

Eliminating depth, $D$, from equations (I) and (II) yields the following relation between pressure and temperature for the area:

$$T = 15 + \frac{13}{450} P \qquad (III)$$

Figure 1:
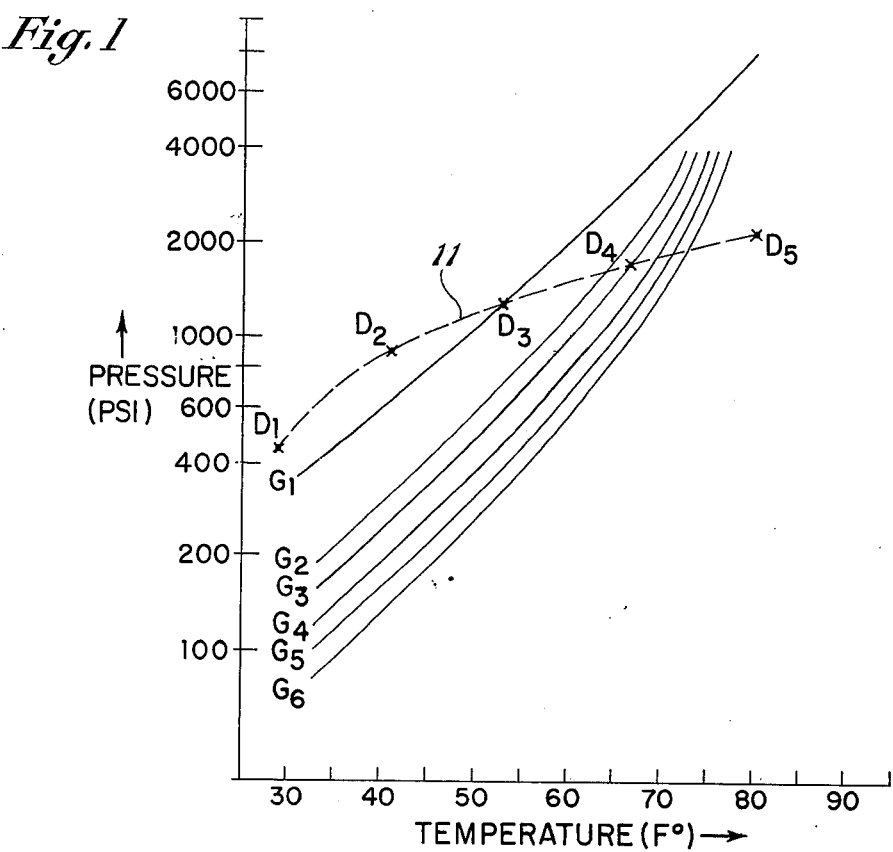
FIG. 1 is a graph of the pressure-temperature relationships defining hydrate forming properties that immobilize, or freeze, natural gas, having depth of known shallow, cold formations imposed thereon in dashed lines.

This relation is plotted on FIG. 1 as the dashed line 11.

Also on FIG. 1, the solid curves show pressure-temperature equilibrium data for natural gas hydrates. For a given gas gravity, if the locus of the pressure and temperature values for a gas field falls above the corresponding gas hydrate curve, then some or all of the gas in the formation exists as hydrate. For example, if a reservoir containing gas of 0.6 gravity has a temperature of 55°F, some or all of the gas will exist as a hydrate if the formation fluid pressure is greater than 700 pounds per square inch (psi). From a consideration of FIG. 1, it is clear that gas hydrate fields can exist in the area at depths shallower than 3,000 to 4,500 feet, depending upon the gas gravity. The depths $D_1$, $D_2$, $D_3$, $D_4$, and $D_5$ represent incremental depths in thousands of feet of 1,000, 2,000, 3,000, 4,000, and 5,000, respectively, while the specific gravities $G_1$–$G_6$ represent gas gravities of $G_1$—0.55, $G_2$—0.58, $G_3$—0.60, $G_4$—0.65, $G_5$—0.70, and $G_6$—0.8.

Figure 2:
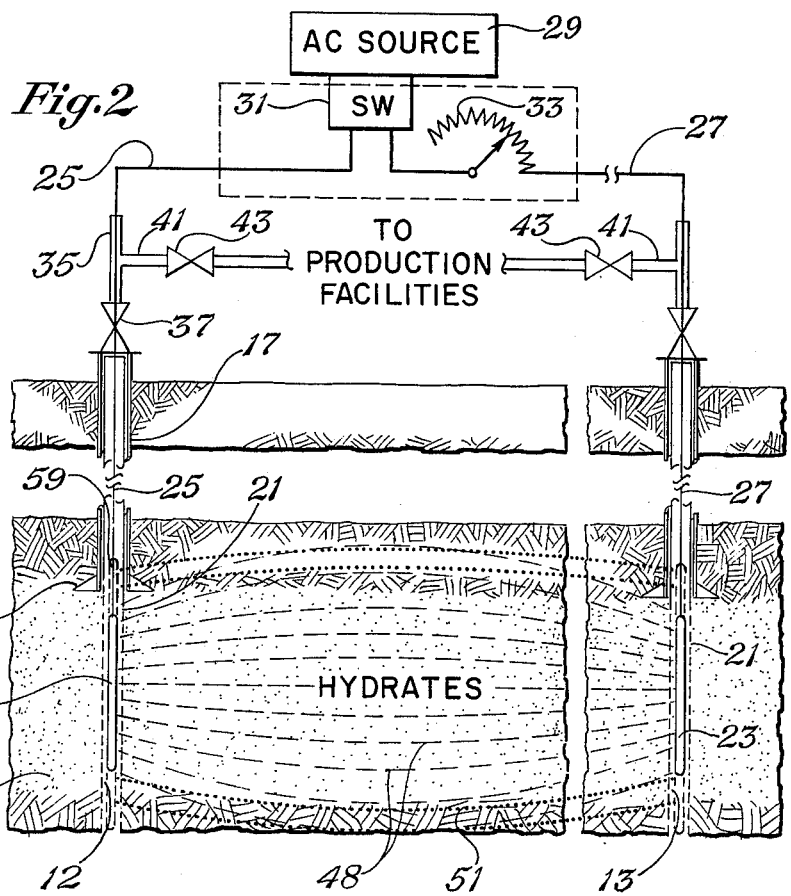
FIG. 2 is a side elevational view, partly schematic and partly in section, illustrating one embodiment of this invention.

Referring to FIG. 2, a plurality of wells 12 and 13 have been drilled into and completed within the subterranean formation 15. Each of the wells 12 and 13 have a string of casing 17 that is inserted in the drilled borehole and cemented in place with the usual foot 19. A perforate conduit 21 extends into the subterranean formation 15 adjacent the periphery of the wellbore that was drilled thereinto. Preferably, the perforate conduit 21 includes a lower electrically insulated conduit for constraining the electrical current flow to the subterranean formation 15 as much as practical. The perforate conduit 21 may be casing having the same or a different diameter from casing 17, or it may be tubing inserted through the casing 17. As illustrated, the perforate conduit 21 comprises tubing large enough for insertion therethrough of the electrodes and electrical conductors; but small enough to prevent loading up the well by a liquid head as the natural gas that is freed is produced through the well. As illustrated, the conduit 21 is not packed off in order that the liquids may be unloaded, if they accumulate in the tubing; for example, by gas injected into the annular space between the casing 17 and the perforate conduit, or tubing, 21 by conventional methods.

Each of the wells 12 and 13 has an electrode 23. The respective electrodes 23 are connected via electrical conductors 25 and 27 with surface equipment 28 and a source of electrical current, illustrated as alternating current (AC) source 29. The electrical conductors 25 and 27 are insulated between the electrodes 23 and the surface equipment 28. The surface equipment 28 includes suitable controls that are employed to effect the predetermined current flow. For example, a switch (SW) 31 and voltage control means, such as rheostat 33, are illustrated for controlling the duration and magnitude of the current flow between the electrodes 23 and the wells 12 and 13 by way of the subterranean formation 15. It is preferred that the alternating current source 29 be adjusted to provide the correct voltage for effecting the current flow through the subterranean formation 15 without requiring much power loss in surface control equipment, exemplified by rheostat 33. The respective electrical conductors 25 and 27 are emplaced in their respective wells 12 and 13 with conventional means. As illustrated, they are run through lubricators 35 in order to allow alternate or simultaneous heating and production; without having to alter the surface accessories; such as, changing the configuration of the well head 37 with its valves and the like. The respective electrodes are also electrically connected with the subterranean formation 15; for example, electrically connected with a metallic conductive conduit 21 that is electriclly connected to the formation 15, maintaining electrolyte intermediate the electrode 23 and formation 15, or both.

As illustrated, the wells 12 and 13 are connected with respective production facilities by way of suitable respective conduit 41 including valves 43. The production facilities are those normally employed for handling natural gas and are not shown, since they are well known in the art. The production facilities range from simple installations for producing substantially pure methane to the more complicated facilities. Ordinarily, however, the facilities will include a water knock-out for separating water that is produced, glycol injectors or the like for preventing the formation of hydrates in long flow lines through arctic terrain, separators for separating out the glycol, and separation facilities for separating any liquid hydrocarbons from the natural gas streams. The liquid hydrocarbons may be separated by lowering the temperature of the gas or through simple gas-liquid separators. The liquid components may be stored in pressurized tanks, such as for propane or LPG, or in conventional stock tanks for the higher boiling liquids. The natural gas is passed into a conventional single phase flow line. If desired, of course, the production facilities can include multiple phase flow lines over long distances. Since these production and processing facilities are well known and do not, per se, form a part of this invention, they are not described in detail herein.

Operation

In operation, the wells 12 and 13 are completed in the subterranean formation 15 in accordance with conventional technology. Specifically, boreholes are drilled, at the desired distances and patterning, from the expansion surface into the subterranean formation 15. Thereafter, the casing 17 is set into the formation to the desired depth. As illustrated, the casing 17 may comprise a surface string that is cemented into place immediately above the subterranean formation 15. Thereafter, the string of tubing, including an insulated perforate conduit 21, is emplaced in the respective boreholes and completed in accordance with the desired construction. For example, perforate conduit 21 may have its foot cemented in place or it may be installed with a gravel pack or the like to allow for expansion and contraction and still secure the desired productivity.

In any event, the electrodes 23 are thereafter placed in the respective wells. For example, the formation may be from only a few feet thick to as much as 50 or 100 or more feet thick; and the electrodes 23 have commensurate length. The electrodes 23 are continuously conductive along their length and are electrically connected with the subterranean formation 15 as described hereinbefore and with the respective electrical conductors 25 and 27 by conventional techniques. For example, the electrodes 23 may be of copper based alloy and may be connected with copper based conductors 25 and 27 by suitable copper based electrical connectors. Thereafter, the alternating current source 29 is connected with the conductors 25 and 27 by way of the surface control equipment, illustrated simply as switch 31 and rheostat 33. If the desired current densities are obtainable without the use of the rheostat, it is set on zero resistance position to obtain the desired current flow between the wells. Since there will be a high current density immediately adjacent each of the electrodes 23, the temperature will tend to increase more rapidly in this area. The current flow through the formation 15 to heat the formation and the hydrates 45 frequently depends on the connate water envelopes 47 surrounding the sand grains 49, or the like. Accordingly, the temperatures in the regions of highest current densities; for example, in the regions immediately about and adjoining the wells 12 and 13; must not be so high as to cause evaporation of the water envelopes 47 at the pressure that is sustainable by the overburden. Expressed otherwise, the predetermined electrical current is maintained low enough to prevent drying of the subterranean formation 15 around the wells 12 and 13. Advantage is taken of the fact that the water from the melting hydrates tends to migrate toward the production well and minimize the drying problem. It may be desirable, however, to periodically interrupt the flow of current and inject a small amount of electrolyte around each of the wells in order to keep the conductivity high in this region.

The electrical current will flow primarily through the subterranean formation 15 as shown by lines 48 when the electrodes 23 are emplaced therewithin, although some of the electrical current will flow through contiguous formations, such as the impermeable shales 51, FIG. 1, above and below the formation 15. The voltage and current flow are adjusted to effect the desired gradual increase in temperature of the formation 15 and the hydrates therewithin without overheating locally at the points of greatest current density, as indicated hereinbefore. For example, the current may run from a few hundred to 1,000 or more amperes at the voltage drop between the electrodes 23 in the wells 12 and 13. This voltage drop may run from a few hundred volts to as much as 1,000 or more volts.

Figure 3:
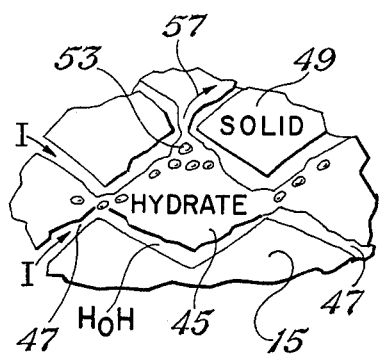
FIG. 3 is a conceptualized microscopic section depicting the production phenomena in the interstices of the subterranean formation in accordance with the embodiment of FIG. 2.

In any event, the pre-heating of the formation and hydrates is continued until the formation and hydrates reach the equilibrium temperature at which the hydrates begin to melt at the pressure of the formation 15. At this point, the temperature remains constant at the melting point of the hydrates and gas, illustrated as bubbles 53, FIG. 3, is freed. As the gas is freed, initially adjacent the wells 12 and 13, there is a tendency for the pressure to increase. The wells 12 and 13 are opened at their respective well heads 37 to allow the gas to flow to the surface and reduce this pressure. If the gas were not produced, the pressure would increase, with the attendant increase in the temperature at which the hydrates would melt. Consequently, absent the simultaneous production of gas, the amount of sensible heat that had to be supplied to the formation and hydrates to raise their temperature to the melting temperature of the hydrates, would have to be increased dramatically. Thus, the gas is freed and flows through the formation to the wells. The melting hydrates increases the permeability immediately adjacent the wells to facilitate the flow of gas from the portions of the formations farther from the wells. This fortuitous happenstance facilitates production of the freed gas from the formation and keeps the pressure in the formation as low as possible to keep the temperature at which the hydrates melt as low as possible. It is also fortuitous that the melting hydrates increase the connate water, which picks up soluble salts, if any were knocked out by the hydrate formation. This, in turn, increases the conductivity of the formation to facilitate electrical conduction in the region of highest current densities and facilitates melting the hydrates in the formation more remote from the wells. As illustrated in FIG. 3, the gas that is freed may migrate under the existing pressure gradient from its in situ location to the respective well. For example, the gas may migrate to the right, as indicated by the arrow 57 if the pressure gradient is toward the well to the right in FIG. 3.

Prior to the initiation of the project of this type, it is advisable to obtain core samples in order that empirical determinations can be made as to the conductivity to be expected as well as the energy input for the particular formation and hydrates. On the other hand, where the existence of hydrates has been verified and where even small amounts of natural gas can be useful, as in powering drilling rigs, engines or the like; the commercial venture can be undertaken directly on a commercial scale with assurance of ultimate success.

To investigate economic feasibility, the theoretical calculations can be made using conventional computer-based temperature formulae for heating subterranean formations containing the hydrates. In a conventional formation, the passage of electrical current will cause the formation and hydrates to be heated directly. Once the temperature at which the hydrates melt is reached in the formation 15, the hydrates begin to melt to liberate the gas. The gas migrates to the respective wells 12 and 13, as indicated hereinbefore, and can be produced and employed at the surface. On a microscopic scale, the local increase in pressure because of gas liberation may effect local elevation of the temperature at which the hydrate melts but this temperature will go back toward the averaged equilibrium temperature as the gas migrates toward the wellbore and is produced.

The foregoing procedure has been described for most formations in which a connate water envelope 47 exists to conduct the electrical current, indicated by the current arrows I, FIG. 3. There may exist formations in which all of the water is tied up in the hydrates, as is all of the natural gas; although I and my co-workers have not found them. In such formations, there would be very little conductivity and very little heating from electrical current flow. With such formations, it becomes necessary to flow electrical current through the overlying and underlying strata, such as strata 51. Consequently, longer electrodes are employed, as illustrated in dotted lines 59 such that the electrode 23 extends into the underlying strata 51, formation 15 and the overlying strata. Initially, the electrical conduction and heating is effected in the overlying and underlying strata and the heat transferred by heat conduction into the formation 15 and the hydrates therewithin. As the hydrates 45 are melted, however, water is freed along with the natural gas. This water tends to form the connate water envelopes 47, pick up soluble salts, and increase the conductivity within the formation 15. With time, the temperature increase of the hydrates and formation 15 increases to achieve a more generalized connate water envelope, such as has been described hereinbefore. Thereafter, the primary electrical conduction and heating will be effected in the formation 15.

Thus, by proper patterning of the wells and employing pre-heating by use of electrical energy to mobilize the immobilized natural gas, as by melting the hydrates tying up the natural gas and the water, the natural gas in a predetermined pattern can by separated from the water in situ and produced to the surface by an engineeringly feasible process.

It is realized that there may be some hazard of electrical shock if conductive fluids, such as salt water, are produced simultaneously with the passage of the electrical current through the formation. The hazard of electrical shock is not insurmountable, however, and careful insulation and operation can prevent hazard to operating personnel and allow concurrent electrical conduction and heating and production of natural gas.

EXAMPLE

The following example is given to demonstrate how a typical process is carried out as described hereinbefore with respect to FIG. 2. The example also gives the engineer a feel for the dynamics that will develop in the project. The exemplified subterranean formation 15 has a depth of 2,000 feet with an averaged pressure of 900 psi and a temperature of 41°F. The formation 15 has an average thickness of about 30 feet and a porosity of 30 percent. It has adequate permeability to produce the natural gas that is liberated as it is liberated without significant increases in pressure within the subterranean formation 15. The formation 15 has 0.475 saturation with free water and a saturation of 0.525 of hydrate. Since it has no free gas it is considered non-productive. The heat capacity of the composite subterranean formation is 31 British Thermal Units per degree Fahrenheit per cubic foot (BTU/°F/ft$^3$). The natural gas obtained by melting, or thermally decomposing, the hydrates has a gravity of 0.555, the top curve in FIG. 1. The hydrate has a specific gravity of 0.9; and a heat of hydrate decomposition, equivalent to the latent heat of fusion of normal ice, of 243 BTU's per pound (lb.). The formation has an amount of gas present as the hydrate with no free gas of 500 standard cubic feet per barrel (SCF/bbl) of pore space. By reference to a detailed figure like FIG. 1, it can be seen that to thermally decompose the hydrate it is necessary first to heat the formation 15 and hydrate to approximately 47°F to bring it to the equilibrium curve for 0.555 gravity gas. If there were free gas or other fluids in the formation, the pressure could be reduced to reduce the temperature at which the hydrate would melt, or decompose. This invention can employ any desirable combination of supplying heat to the formation and hydrate and/or reducing the pressure within the formation to melt the hydrate. After the system has been brough to a temperature equivalent to the equilibrium curve, heat must be supplied to the hydrate to melt it. The following table summarizes pertinent information.

TABLE

Heat required to raise formation from 41°F to 47°F
$$= 6 \times 31$$
$$= 186 \text{ BTU/ft}^3 \text{ of formation}$$
$$= 186 \times 30 \times 43560$$
$$= 2.43 \times 10^8 \text{BTU/acre}$$

Amount of hydrate present per cubic foot of formation
$$= 0.30 \times 0.525 \times 0.9 \times 62.4 = 8.84 \text{ lb/ft}^3$$

Heat required to decompose hydrate
$$= 243 \times 8.84 \times 2150 \text{ BTU/ft}^3$$
$$= 2150 \times 30 \times 43560$$
$$= 2.82 \times 10^9 \text{ BTU/acre}$$

Total heat required to liberate gas
$$= 2.82 \times 10^9 + 2.4 \times 10^8 = 3.06 \times 10^9 \text{ BTU/acre}$$

Amount of gas liberated
$$= \frac{0.30}{5.614} \times 500 = 26.7 \text{ SCF/ft}^3 \text{ of formation}$$
$$= 26.7 \times 30 \times 43560$$
$$= 0.349 \times 10^8 \text{ SCF/acre}$$

Heat required to liberate one unit volume of gas
$$= \frac{3.06 \times 10^9}{.349 \times 10^8}$$
$$= 87.5 \text{ BTU/SCF}$$

It is noteworthy that 26.7 standard cubic feet (SCF) of gas would be liberated per cubic feet of reservoir space. Since the formation in this example contains only 0.3 cubic feet of pore space per cubic foot of formation and the major portion of the pore space will be filled with free water and water liberated from hydrate decomposition, very high pressures will be exerted by the liberated gas if it is not produced simultaneously with the heating, as indicated hereinbefore.

From the foregoing descriptive matter, it can be seen that this invention provides a novel and unobvious way of recovering natural gas from a subterranean formation that heretofore would not have been produced because from all indications it was commercially nonproductive. Moreover, this invention achieves all of the objects delineated hereinbefore.

Having thus described the invention, it will be understood that such description has been given by way of illustration and example and not by way of limitation, reference for the latter purpose being had to the appended claims.

The embodiments of the invention in which an exclusive property or privilege is claimed are defined as follows:

1. A method of producing gas from at least one subterranean formation comprising the steps of:
    a. drilling at least two spaced apart wells from the surface of the earth into a subterranean formation that contains at least some of the gas in the form of hydrate;
    b. melting said hydrate in said subterranean formation to free natural gas in situ; said melting of said hydrate including the step of heating said subterranean formation and said hydrate; said heating being effected by electrical conduction comprising passing from one of said wells to another of said wells an electrical current of sufficient magnitude to heat said formation; and
    c. producing gas to the earth's surface.

2. The method of claim 1 wherein said melting of said hydrate includes the steps of substantially at the same time:
    a. producing gas to the earth's surface from said subterranean formation to lower the pressure in said subterranean formation below what it would normally be;
    b. supplying heat to said formation and said hydrate via said electrical conduction to raise the temperature thereof to about the equilibrium temperature at which said hydrate melts; and
    c. supplying by said electrical conduction sufficient heat to melt at least part of said hydrate and thereby free some gas therefrom.

3. The method of claim 1 wherein said subterranean formation initially has essentially no free connate water and said electrical current initially is primarily conducted through adjacent conductive formations to supply heat thereto, said heat being conducted into said subterranean formation containing said hydrate to melt said hydrate and create some free connate water and render said subterranean formation more electrically conductive.

4. The method of claim 1 wherein said subterranean formation initially contains less than the amount of free gas considered to be commercially productive by conventional gas engineering standards.

5. The method of claim 1 wherein said subterranean formation has a low electrical conductivity and said electrical current is primarily conducted through adjacent conductive formations to supply heat thereto, said heat being conducted into said subterranean formation containing said hydrate.

* * * * *